(12) United States Patent
Arfvidsson et al.

(10) Patent No.: US 11,301,729 B2
(45) Date of Patent: *Apr. 12, 2022

(54) SYSTEMS AND METHODS FOR INFERENTIAL SHARING OF PHOTOS

(71) Applicant: Google LLC, Mountain View, CA (US)

(72) Inventors: Emil Arfvidsson, Mountain View, CA (US); Andrew Gerrit Adriaan Huibers, Sunnyvale, CA (US); Kevin Nuesa Gabayan, Santa Clara, CA (US); Seth Taylor Raphael, Mountain View, CA (US)

(73) Assignee: Google LLC, Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/849,874

(22) Filed: Apr. 15, 2020

(65) Prior Publication Data
US 2020/0242419 A1 Jul. 30, 2020

Related U.S. Application Data

(63) Continuation of application No. 15/976,364, filed on May 10, 2018, now Pat. No. 10,643,110, which is a
(Continued)

(51) Int. Cl.
*G06K 9/62* (2006.01)
*G06K 9/66* (2006.01)
(Continued)

(52) U.S. Cl.
CPC ....... *G06K 9/6277* (2013.01); *G06F 16/5866* (2019.01); *G06K 9/00228* (2013.01);
(Continued)

(58) Field of Classification Search
CPC .... G06K 9/6277; G06K 9/00228; G06K 9/66; G06F 17/30268; H04L 67/10; H04L 67/36; H04L 69/28
See application file for complete search history.

(56) References Cited

U.S. PATENT DOCUMENTS

| 8,798,401 B1 | 8/2014 | Johnson et al. |
| 2007/0008321 A1 | 1/2007 | Gallagher et al. |

(Continued)

OTHER PUBLICATIONS

Burghardt et al, "Primo—Towards Privacy Aware Image Sharing".

*Primary Examiner* — David F Dunphy
(74) *Attorney, Agent, or Firm* — IP Spring

(57) ABSTRACT

Techniques for separating shareable images from non-shareable images. In various implementations, image metadata and feature analysis may be used to evaluate the "shareability" of a photograph associated with a particular user. In some implementations, single photos may be determined to be shareable. In another implementation, an event associated with multiple photos may be determined to be shareable. In some implementations, a photo may be determined to be shareable with a single recipient. In another implementation, a photo may be determined to be shareable with multiple recipients. In yet another implementation, these techniques may be assisted by supervised machine learning. In still yet another implementation, photos determined to be shareable may be suggested to a user for sharing, or automatically shared, per an opt-in feature.

20 Claims, 11 Drawing Sheets

Related U.S. Application Data continuation of application No. 15/623,792, filed on Jun. 15, 2017, now Pat. No. 9,978,001, which is a continuation of application No. 15/137,812, filed on Apr. 25, 2016, now Pat. No. 9,691,008, which is a continuation of application No. 14/454,644, filed on Aug. 7, 2014, now Pat. No. 9,325,783.

(60) Provisional application No. 61/863,331, filed on Aug. 7, 2013.

(51) Int. Cl.
*G06K 9/00* (2006.01)
*G06F 16/58* (2019.01)
*H04L 67/10* (2022.01)
*H04L 67/75* (2022.01)
*H04L 69/28* (2022.01)
*G06Q 50/00* (2012.01)

(52) U.S. Cl.
CPC .............. *G06K 9/66* (2013.01); *H04L 67/10* (2013.01); *H04L 67/36* (2013.01); *H04L 69/28* (2013.01); *G06Q 50/01* (2013.01)

(56) References Cited

U.S. PATENT DOCUMENTS

| | | |
|---|---|---|
| 2011/0188742 A1 | 8/2011 | Yu et al. |
| 2012/0084731 A1 | 4/2012 | Filman et al. |
| 2012/0222132 A1* | 8/2012 | Burger .................. G06F 21/604 |
| | | 726/28 |
| 2013/0013699 A1 | 1/2013 | Huxley |
| 2013/0027571 A1 | 1/2013 | Parulski |
| 2014/0093174 A1* | 4/2014 | Zhang ................ G06K 9/00684 |
| | | 382/190 |
| 2014/0250175 A1* | 9/2014 | Baldwin .................. H04W 4/08 |
| | | 709/204 |

* cited by examiner

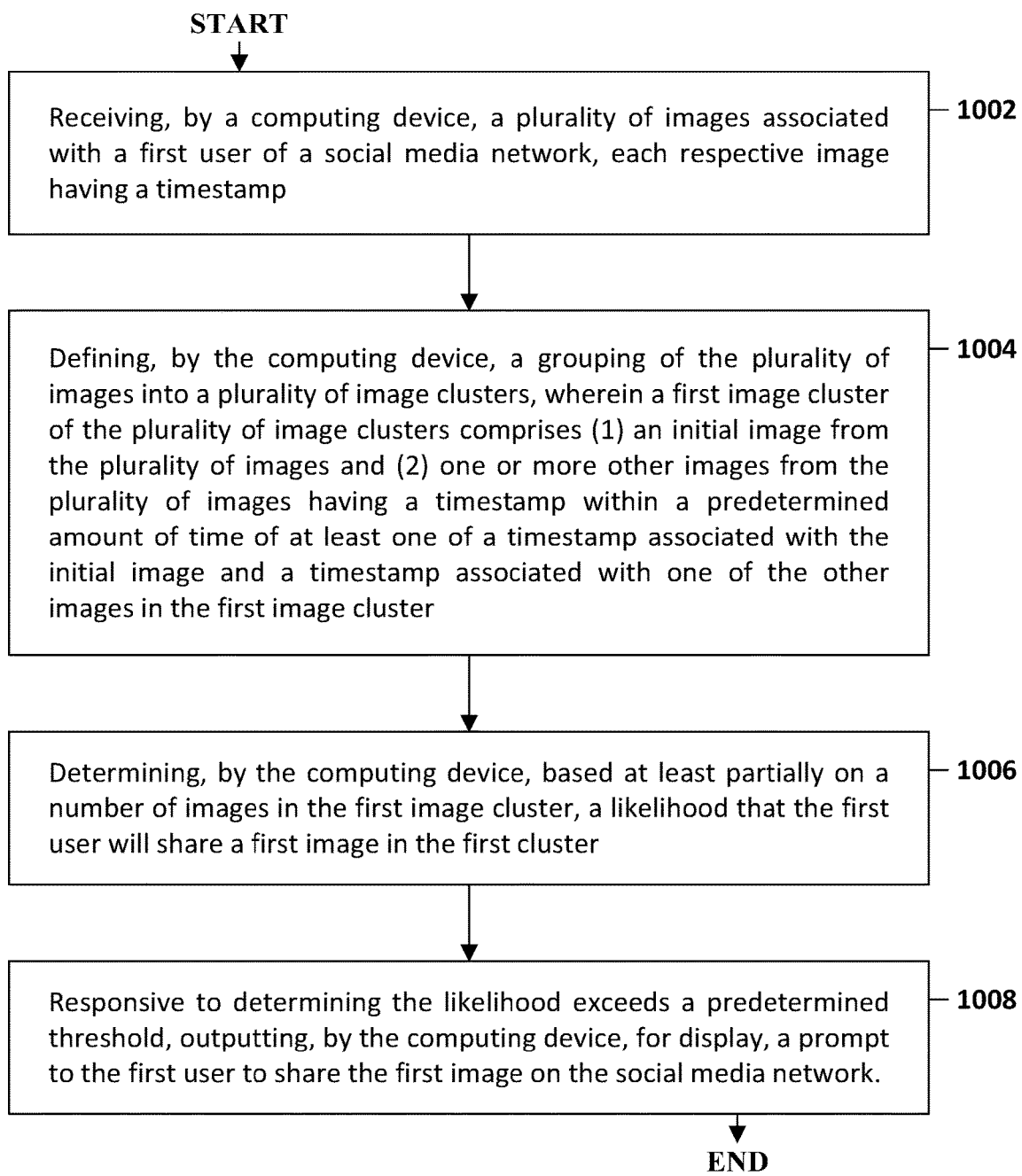

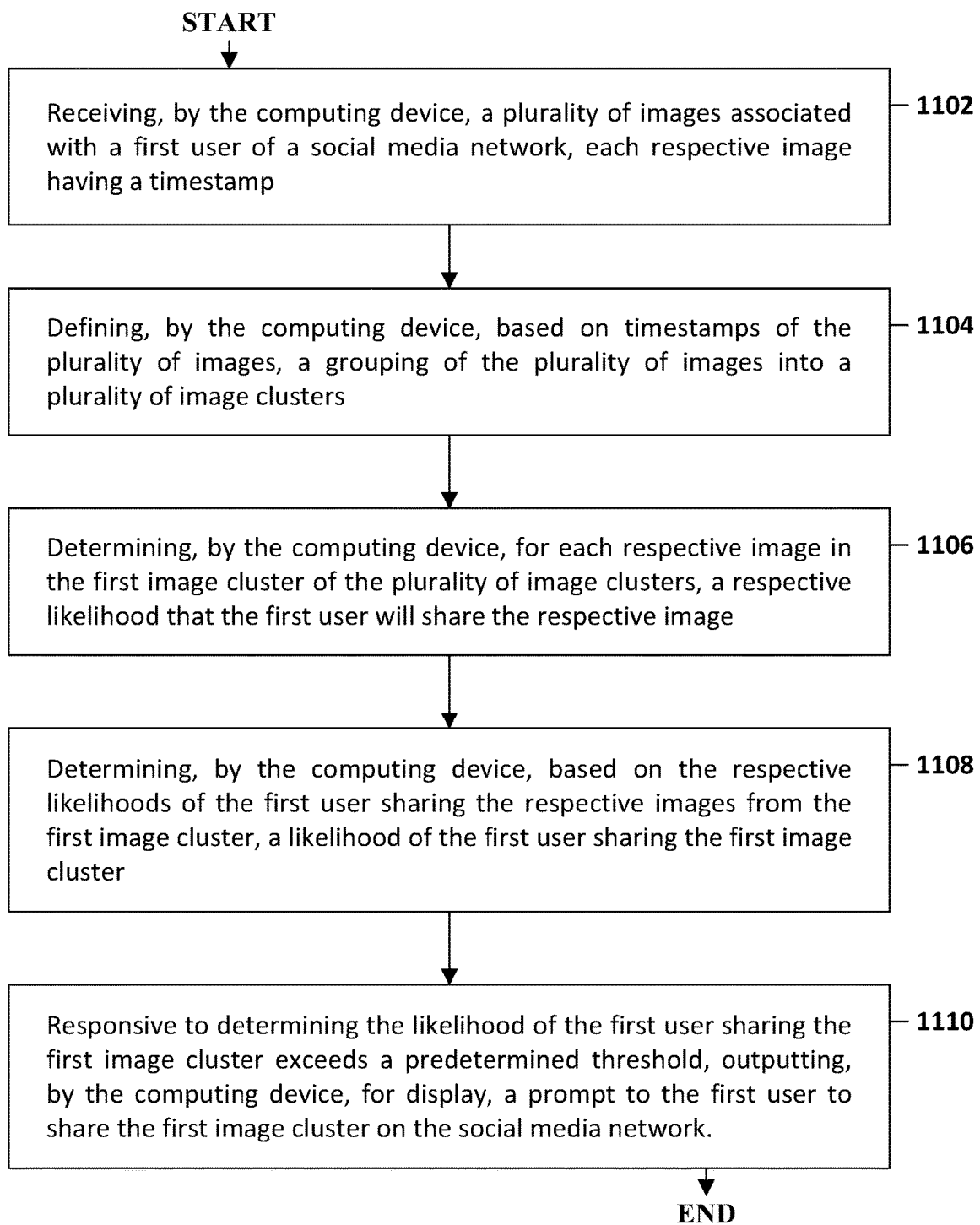

SYSTEMS AND METHODS FOR INFERENTIAL SHARING OF PHOTOS

CROSS-REFERENCE TO RELATED APPLICATIONS

This application is a continuation, and claims the benefit under 35 U.S.C. § 120, of U.S. patent application Ser. No. 15/976,364, filed May 10, 2018, which is a continuation of U.S. patent application Ser. No. 15/623,792, filed 15 Jun. 2017, which is a continuation of U.S. patent application Ser. No. 15/137,812, filed 25 Apr. 2016, which is a continuation of U.S. patent application Ser. No. 14/454,644, filed 7 Aug. 2014, which claims the benefit under 35 U.S.C. § 119(e) of U.S. Provisional Patent Application No. 61/863,331, filed 7 Aug. 2013, of which the entire contents and substance are hereby incorporated by reference as if fully set forth below.

BACKGROUND

Countless photographs are taken every day. Many of these photos will be shared directly with friends, acquaintances, or family, or published on a website or blog. For example, one social media network reports receipt of hundreds of millions of photos per day from over a billion users. Selecting a photo to share and recipients to share the photo with can be a time consuming task. Accordingly, robust techniques for automatically determining which photos a user may wish to share could result in substantial time and productivity savings for a large segment of the population.

However, current techniques for automatically determining a "shareability" of photos are insufficient. For example, some conventional techniques are limited to taking into account environmental signals, for example, a proximity of a sending and recipient user, when determining whether a photo should be shared with the second user. Thus, a timing and range for sharing photos may be unnecessarily limited by a geographic relationship of the participants at the time of photo capture.

SUMMARY

Some or all of the above deficiencies may be addressed by certain implementations of the disclosed technology. Certain implementations include techniques for separating shareable images from non-shareable images. In some implementations, such techniques may be assisted by supervised machine learning. Accordingly, implementations of the disclosed technology may provide a generalized, high performance mechanism for identifying and suggesting shareable content from among a collection of media.

According to an example implementation, a method is provided. The method may include receiving a plurality of images associated with a first user of a social media network. Each respective image may have a timestamp. The method may further include defining a grouping of the plurality of images into a plurality of clusters. A first cluster of the plurality of clusters may comprise (1) an initial image from the plurality of images (2) one or more other images from the plurality of images having a timestamp within a predetermined amount of time of at least one of a timestamp associated with the initial image and a timestamp associated with one of the other images in the first image cluster. The method may yet further include determining based at least partially on a number of images in the first cluster, a likelihood that the first user will share a first image in the first cluster. The method may also include, responsive to determining the likelihood exceeds a predetermined threshold, outputting for display, a prompt to the first user to share the first image on the social media network. Alternatively, the method may also include, responsive to determining the likelihood exceeds a predetermined threshold, automatically sharing the first image on the social media network.

According to another example implementation, a method is provided. The method may include receiving a plurality of images associated with a first user of a social media network. Each respective image may have a timestamp. The method may further include defining a grouping of the plurality of images into a plurality of clusters. Each respective cluster of the plurality of clusters may comprise (1) an initial image from the plurality of images and (2) any other images from the plurality of images having a timestamp within a predetermined amount of time of a timestamp associated with the initial image and or within the predetermined amount of time of a timestamp associated with one of the other images in the respective cluster. The method may yet further include determining, for each respective image in a first image cluster of the plurality of image clusters, a likelihood that the first user will share the respective image. The method may still yet further include determining, based on the likelihoods of the first user sharing the respective images from the first image cluster, a likelihood of the first user sharing the first image cluster. The method may also include, responsive to determining the likelihood of the first user sharing the first image cluster exceeds a predetermined threshold, outputting for display, a prompt to the first user to share the first image cluster on the social media network.

According to another example implementation, a computer program product is provided. The computer program product may include a non-transitory computer readable medium. The computer readable medium may store instructions that, when executed by at least one processor in a system, cause the processor to perform a method substantially similar to the methods described hereinabove.

According to yet another example implementation, a system is provided. The system may include an image capture device coupled to a computing device, and a memory operatively coupled to the computing device and configured for storing data and instructions that may be executed by the processor. When executed, the system may be caused to perform a method substantially similar to the methods described hereinabove.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

The patent or application file contains at least one drawing executed in color. Copies of this patent or patent application publication with color drawings(s) will be provided by the Office upon request and payment of the necessary fee.

Reference will now be made to the accompanying figures and flow diagrams, which are not necessarily drawn to scale, and wherein:

FIG. 10 is a flow diagram of a method 1000 for separating shareable images from non-shareable images, according to an example implementation.

FIG. 11 is a flow diagram of another method 1100 for separating shareable images from non-shareable images, according to an example implementation.

DETAILED DESCRIPTION

Figure 1:
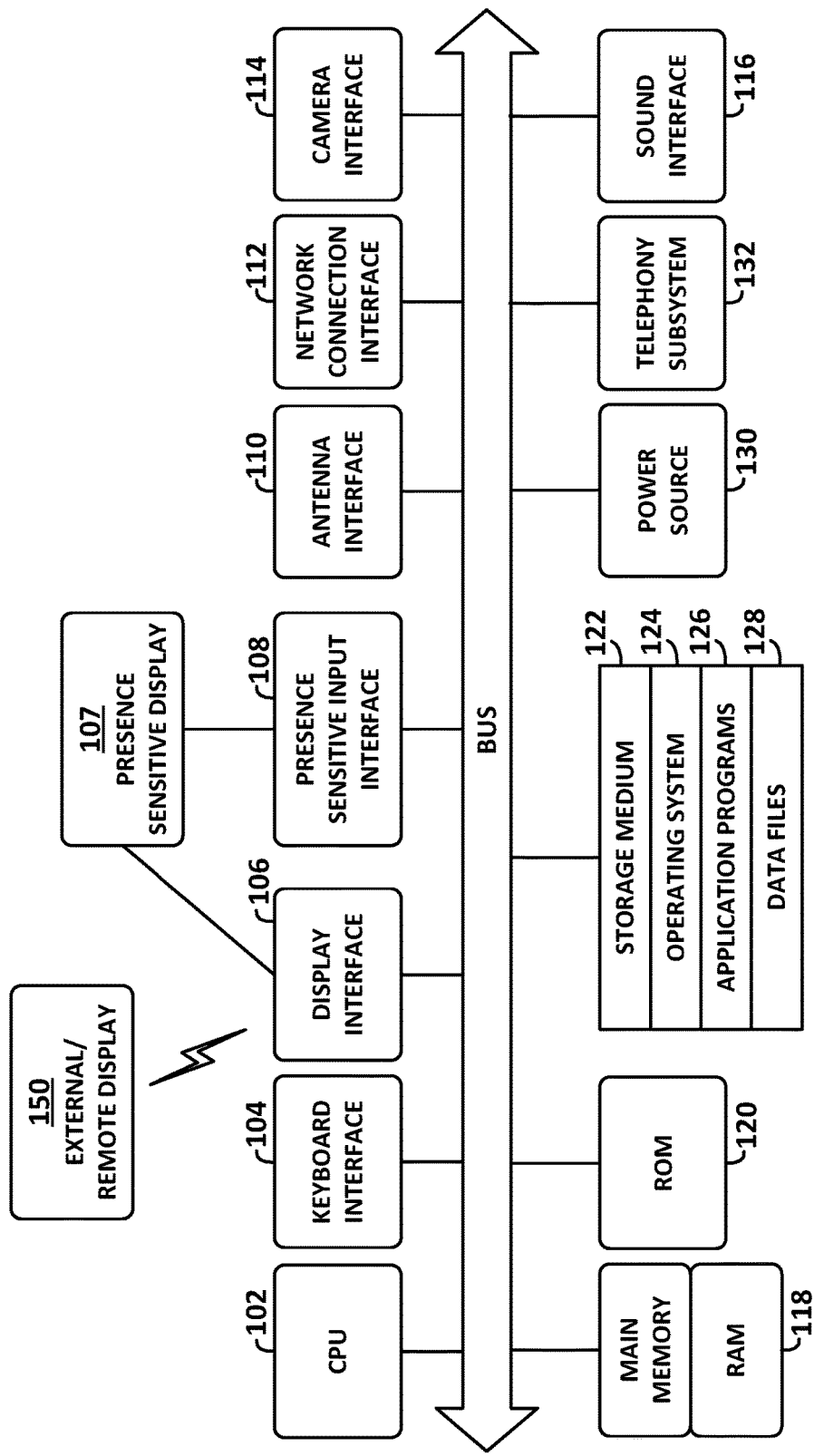
FIG. 1 depicts a block diagram of illustrative computing device architecture 100, according to an example implementation.

Implementations of the disclosed technology include techniques for separating shareable images from non-shareable images. In various implementations, image metadata and feature analysis may be used to evaluate the "shareability" of a photograph associated with a particular user. In some implementations, single photos may be determined to be shareable. In another implementation, an event associated with multiple photos may be determined to be shareable. In some implementations, a photo may be determined to be shareable with a single recipient. In another implementation, a photo may be determined to be shareable with multiple recipients. In yet another implementations, these techniques may be assisted by supervised machine learning. In still yet another implementation, photos determined to be shareable may be suggested to a user for sharing, or automatically shared, per an opt-in feature.

Some implementations of the disclosed technology will be described more fully hereinafter with reference to the accompanying drawings. The disclosed technology may, however, be embodied in many different forms and should not be construed as limited to the implementations set forth herein. For example, some implementations may be used to evaluate the shareability of video and other media content.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for separating shareable images from non-shareable images, and will now be described with reference to the accompanying figures.

FIG. 1 depicts a block diagram of illustrative computing device architecture 100, according to an example implementation. Certain aspects of FIG. 1 may be embodied in a computing device 200 (for example, a mobile computing device). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain implementations of the disclosed technology include techniques for separating shareable images from non-shareable images. In some implementations, a photo may be determined as shareable based on metadata and other attributes of a photo—for example, attributes such as geo-location (e.g., latitude, longitude), and timestamp (at what time the photo was taken). Other information, such as how many or which of the user's friends were present and/or also taking photos may also be used to determine whether and to which users the photo may be shared.

By utilizing more of the information available, an improved smart photo suggestion mechanism may be created. However, manually choosing various conditions and accompanying thresholds to consider can become unwieldy as the amount of available information increases. Instead, a more general solution may be needed. Accordingly, some implementations may leverage machine learning to model the shareability of a given photo or a group of photos. To avoid red herrings and identify non-obvious indicators, various pieces of information, or "features" were suggested and accounted for in an example generalized model. Through experimentation, the validity of certain features as indicators was confirmed in the tests described herein.

According to certain implementations, photos transferred to a user or computer may be marked as "shared" photos. All photos that have not been shared may be considered "unshared" photos. With historical labels like these for a large amount of users and their photos, it may be possible to infer a pattern between a newly taken photo and its label. The following example demonstrates a technique for determining a shareability of an individual photo.

In the following example, historical shares were obtained for many users, meaning that a share or non-share label has been associated with each photo. For each individual photo, there was a base amount of data available regarding that photo. First, each photo itself had associated metadata. This metadata contained items such as GPS coordinates and the time the photo was taken (e.g., in Unix time). Secondly, each photo was traceable to the user who owned the photo, so given a first photo, the rest of that user's photos could be identified.

For the following example, users with a certain version of the iOS client were chosen. From this set, a random subset of users was selected. The size of this subset was chosen such that N>100,000, where N is the number of users. For each user, only photos taken between 28 Mar. 2013 and 2 May 2013 were considered, as historical sharing data was not available, or unreliable, before this date.

It is worth noting that the labels described herein, i.e., the historical sharing data, may not accurately represent whether a photo truly is shareable or not. Since these labels come from actions users take in the example app, it may be wrong to assume that a photo is not shareable if the user has not shared it through the app. For example, maybe the user will share the photo in the future, or maybe the user has shared the photo through other unknown or undetectable means. It is also possible that users (in general) may share fewer photos than they might want to, due to reasons like a lack of an unobtrusive photo sharing application. To summarize, the labels are binary, either shared or non shared. In the shared case it may be certain that the photo truly is a shareable photo since the user has explicitly taken the action to share it. In the non-shared case however, it may not be certain that the photo is not shareable. However, the richness and scale of the data set available was still interesting enough for this analysis to be carried out as a binary classification problem.

In this example, a limited number of information items were available for each photo, e.g., a time the photo was taken, and a location. However, more features can be derived from these items. For example, given the location for and Unix time a photo was taken, the corresponding day of the week may be determined. The day of the week is potential signal of importance for determining whether a photo should be shared, compared to baldly considering at the number of seconds since Jan. 1, 1970. In a similar fashion, various other features were extracted from available data points. This process will be referred to herein as "feature engineering."

The feature engineering process requires specific insight or at least theories of what makes a photo more or less likely to be shared. The process used in these examples was an iterative process with the following workflow:

1. Form hypothesis of what makes a photo more shareable, e.g., "a photo that is taken on a weekend is more likely to be shared."
2. Formalize the hypothesis into something measurable e.g. "Day of week." This is referred to as a "feature."
3. Read this feature out from the metadata associated with the photo. If it is not possible to form this feature from the metadata, the feature may be dropped and the process restarted from Step 1.
4. Add this new feature to the model and evaluate the result.
5. Start over from Step 1 until the result is satisfactory.

For this example, the set of features shown in Table 1 were engineered.

TABLE 1

Engineered Features

| Feature name | Feature Type | Explanation |
| --- | --- | --- |
| At home | Binary | Indicating whether this photo was taken at home. |
| At work | Binary | Indicating whether this photo was taken at work. |
| Average time between photos in cluster | Scalar | Described later herein. |
| # Friends | Scalar | The number of friends this user has. More friends may indicate a higher usage level of the app, and to some degree affect the number of pictures that are shared. |
| Day of week | Categorical | The day of week this photo was taken. This feature may be split into seven distinct features as described later herein. |
| Distance to home | Scalar | Distance from where this photo was taken to home. |
| Distance to work | Scalar | Distance from where this photo was taken to work. |
| First time visiting this place | Binary | Whether this photo is the first photo taken at this location. If a user is visiting a new place for the first time, this might indicate the photos are more likely to be shared. |
| Median time between photos in cluster | Scalar | Described later herein. |
| Near collocations | Scalar | Number of collocation events within a predetermined time, (e.g., 1.5 hours) of this photo. |
| Number of collocated friends | Scalar | Number of collocated friends associated with this photo. |
| Number of faces | Scalar | Number of faces detected in this picture. If there are many faces in a photo, this might the photo is more likely to be shared. |
| Own photos nearby | Scalar | Existence of other photos taken by the user at or near a same location. A recurring photo location might indicate home, work, or another commonly visited location. |
| Photo's day activity above average | Binary | Described later herein. |
| Photo's day activity above median | Binary | Described later herein. |
| Photo's day activity percentile | Scalar | Described later herein. |
| Photo's day activity rank | Scalar | Described later herein. |
| Photo's day activity $\sigma$ | Scalar | Described later herein. |
| Photos shared fraction | Scalar | Fraction of photos this user has ever shared. |
| Size of cluster | Scalar | Size of the cluster this photo belongs to. |
| Time after previous photo | Scalar | Time between the last photo taken and this photo. A short interval may indicate the user is taking photos rapidly, and might indicate the photos are more likely to be shared. |
| Time cluster spans | Scalar | The total time this photo cluster spans. |
| Time of day | Scalar | The time of day in local time this photo was taken. A photo taken in the evening, for example, might be more likely to be shared compared to a photo taken in the morning. |
| Time until next photo | Scalar | Similar to Time after previous photo but instead specifies the time between this photo and a next photo. |

Temporal clustering of photographs: Each photo had a UNIX timestamp associated with it. If the timestamps were extracted from each photo, and put in ascending sorted order, a list l of n timestamps may be formed, where n is the number of photos:

$$l=[t_1, t_2, \ldots, t_n]$$

A clustering of the photos may be performed by splitting the list where the difference in time between two consecutive photos exceeds a certain cutoff C forming clusters y:

$$y=[[t_1, t_2, \ldots, t_m], [t_{m+1}, t_{m+2}, \ldots, t_{m+k}], \ldots]$$

where:

$$t_{m+1} - t_m > C$$

It was not obvious which value of C would work best, or indeed if any single value would be adeqaute, so multiple values were used for C and all features directly related to the temporal clustering were computed once per value of C. C assumed values 15, 30, 60, 120, 240 (minutes).

Two features that were directly related to temporal clustering are Size of cluster and Time cluster spans. They were therefore split into five features each, one for each value of C. This was also repeated for the features Average time between photos in cluster and Median time between photos in cluster.

Collocations: When two users that are friends take photos while being spatially and temporally near each other, they may generate something called collocation events. These collocation events may be stored and used as an indication of whether a photo is more likely to be shared. An underlying theory is that if a user takes a photo near someone that is their friend, they are more likely to share that photo since one of their friends was nearby. The lack of a collocation event associated with a photo does not necessarily indicate that no friends were nearby, just that no friends that could be detected were nearby.

Photo activity: Pictures may be taken with varying rates and this rate could possibly be a signal identifying the shareability of the photo. For example, some days only a few photos may be taken, other days many photos may be taken. This behavior may be potentially very individual—some people might take far fewer photos than other people, and a "busy" day for one person is not necessarily a busy day for another person. Comparing activity levels on a per-day basis may allow using relative measures such as "This day was a more active day compared to the other days."

A given day's activity level was assessed as the number of photos the user took that day. All activity levels were calculated, and each photo was then attributed with information related to the activity level of the day it was taken. The features are described in Table 2.

TABLE 2

Features extracted from the photo activity levels

| | | |
|---|---|---|
| Photo's day activity rank | $\mathbb{Z}^+$ | The relative position of this day's activity level d compared to the other days. |
| Photo's day activity above average | 0, 1 | If this day's activity level d is above average, this attribute is True (1), otherwise False (0). |
| Photo's day activity above median | 0, 1 | If this day's activity level d is above the median, this attribute is True (1), otherwise False (0). |

TABLE 2-continued

Features extracted from the photo activity levels

| | | |
|---|---|---|
| Photo's day activity percentile | [0, 100] | The percentile of this day's activity level d. |
| Photo's day activity σ | $\mathbb{R}$ | The standard deviation of all days' activity level d. |

Figure 2:
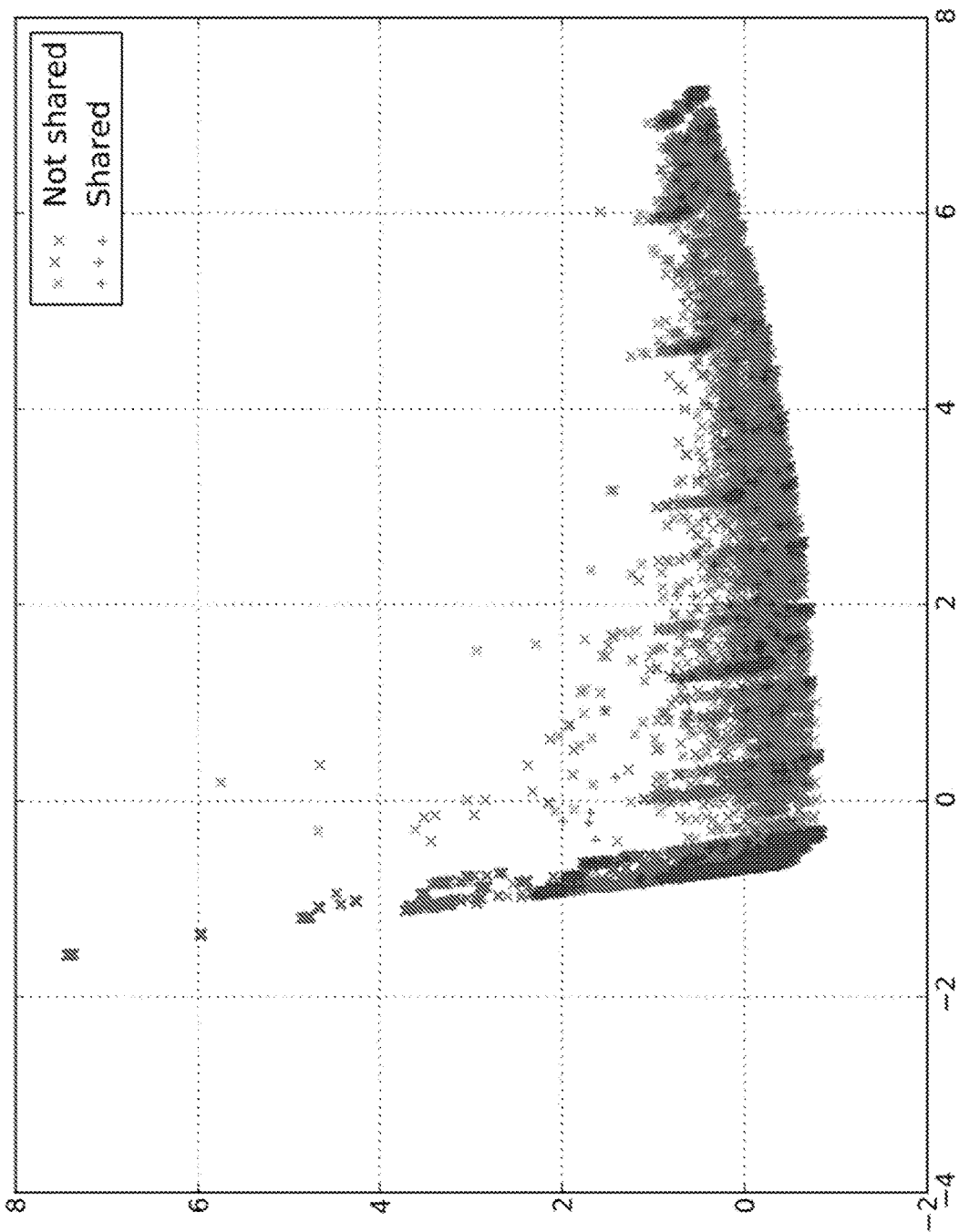
FIG. 2 depicts an illustration of PCA analysis 200 of a set of samples, according to an example implementation.

FIG. 2 depicts an illustration of PCA analysis 200 of a set of samples, according to an example implementation. For each sample, values of the two principal components that have the highest variance were plotted. Each sample was also annotated with its label. The overlap of classes here is clear—it may not be possible to cleanly separate this data in these two dimensions. While higher dimensionality may be used to separate the classes, this figure shows that it may not be trivial to separate the classes. The PCA analysis was generated by first reducing the samples to 100,000 randomly selected samples of the imbalanced dataset. Each column in the sample matrix was then scaled so that it had zero mean and unit variance. The scaling of the feature columns may be necessary because PCA is sensitive to the relative scaling of feature columns.

Once features were generated for each photo, the samples were processed before they were used as training data for the model. The class distribution is shown in Table 3. As evident from Table 3, the classes were imbalanced, and around 4% of examined photos had a positive label.

TABLE 3

Class distribution of the training samples

| | Number of samples | Percentage |
|---|---|---|
| Shared (positive) | 80,017 | 4% |
| Not shared (negative) | 1,896,119 | 96% |
| Total | 1,976,136 | 100% |

In this example, the classes were manually balanced by undersampling the sample array. Samples from the larger class were randomly removed until the classes were identical in size. This undersampling was also advantageous in time spent training the model, as the number of samples was greatly reduced, thus significantly reducing the time required for training. An alternative to undersampling the data is oversampling, i.e., creating more samples from the minor classes. This technique was unnecessary in this example, as there was no lack of data in any category.

The limit of 250,000 users was chosen as a tradeoff between performance and training time. In further testing, using more than 250,000 users gave a slight increase in the performance of the model with a significantly increased cost of training.

The number of samples in each class after the dataset was balanced is shown in Table 4.

TABLE 4

Class distribution in each fold

| Fold | Positive samples | Negative samples | Percentage of all samples |
|---|---|---|---|
| 1 | 6962 (47%) | 7814 (53%) | 9.2% |
| 2 | 7105 (48%) | 7603 (52%) | 9.2% |
| 3 | 8528 (51%) | 8042 (49%) | 10.4% |

TABLE 4-continued

Class distribution in each fold

| Fold | Positive samples | Negative samples | Percentage of all samples |
|------|------------------|------------------|---------------------------|
| 4    | 7893 (49%)       | 8298 (51%)       | 10.1%                     |
| 5    | 8797 (52%)       | 8219 (48%)       | 10.6%                     |
| 6    | 8486 (51%)       | 8130 (49%)       | 10.4%                     |
| 7    | 8557 (52%)       | 7995 (48%)       | 10.3%                     |
| 8    | 8201 (51%)       | 8008 (49%)       | 10.1%                     |
| 9    | 8447 (51%)       | 8014 (49%)       | 10.3%                     |
| 10   | 7041 (47%)       | 7894 (53%)       | 9.3%                      |

To validate the performance of the model, cross-validation was used. However, special care was required in the cross-validation due to the nature of the samples. All the samples were stored in a list s:

$$s=[s_1, s_2, \ldots, s_n]$$

However, since the samples were sourced from specific users—and one user's sharing preferences might vary wildy from any other user—the samples may not be independent. Samples from a single user are dependent on each other. In the sample array, samples from one user appear in contiguous sequence like shown below.

$$s=[s_{1_1}, s_{1_2}, \ldots, s_{1_j}, s_{2_1}, s_{2_2}, \ldots, s_{2_{j'}}, \ldots, s_{n_1}, s_{n_2}, \ldots, s_{n_{k'}}]$$

This was taken into account when doing cross-validation. If samples used for training are dependent on samples used for testing, this could affect the perceived performance of the model since the model likely will be better at predicting samples that are very similar to ones it has seen before. Furthermore, a model that generalizes to new users was desired in this example and not a model that requires training data to exist for a particular user. As such, care was taken when doing the ten-fold cross-validation to make sure users' samples end up in different folds while still preserving the class distribution in each fold.

This was achieved by creating k empty buckets (or folds), and, for each user, placing all of that user's samples into one of the buckets. Which bucket to put the user's samples was chosen at random, in a uniform manner. Thus, each of the k buckets contained samples from multiple users, and all the buckets added together contains the whole dataset. One potential issue with distributing the samples in a random fashion is that the class distribution in each fold may be very different from the class distribution in the samples as a whole. Training on data with a different class distribution than the testing data could potentially give misleading results. However, the class distribution in each fold were observed to be similar to the entire (balanced) dataset, as shown in Table 5.

When running the cross-validation, one of the k folds was held out as testing data while the remaining k−1 folds were used as training data. This was repeated k times until all folds had been used as testing data once.

Figure 3:
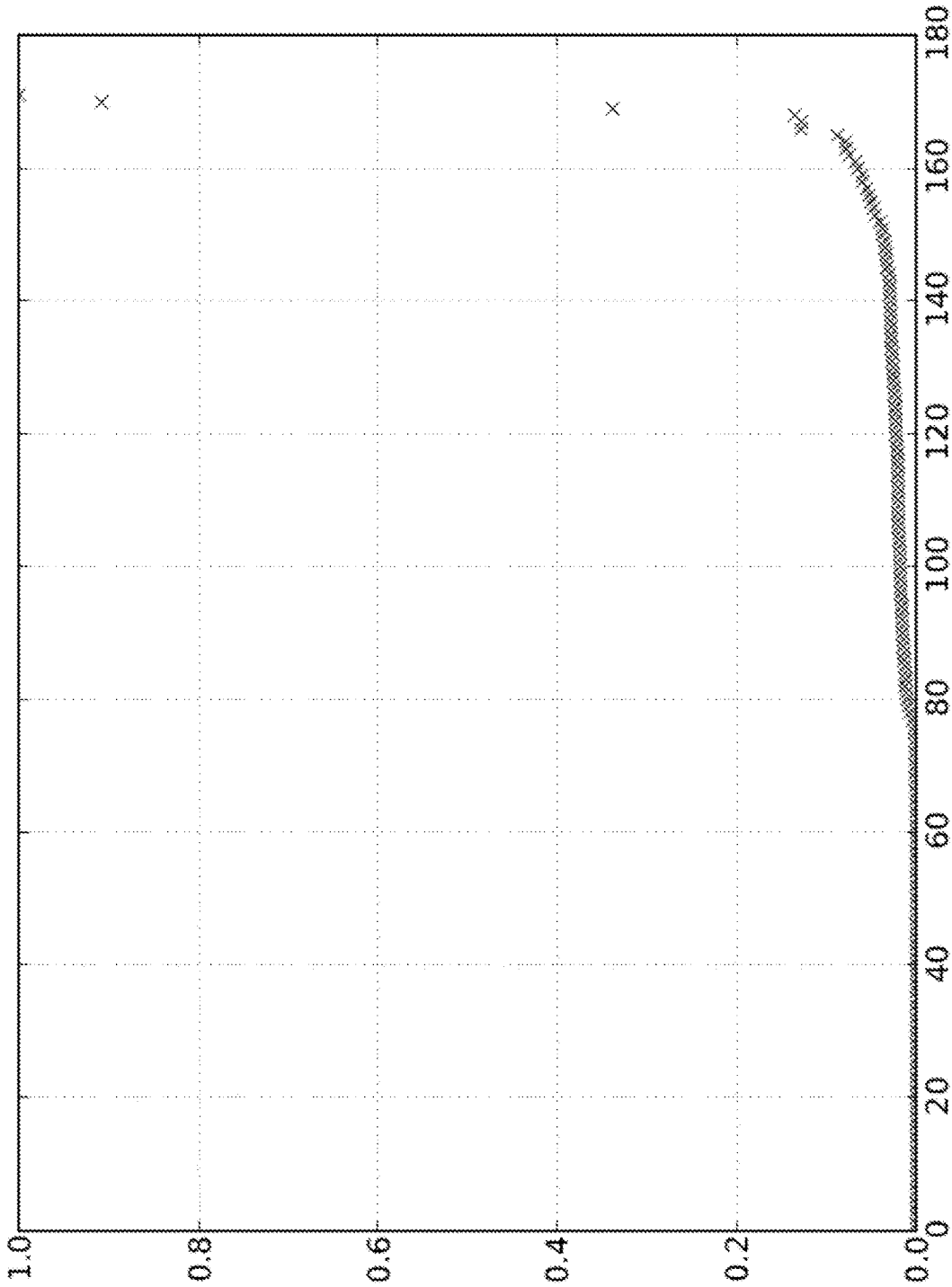
FIG. 3 depicts an illustration of a plot 300 of relative feature importance, according to an example implementation.

FIG. 3 depicts an illustration of a plot 300 of relative feature importance, according to an example implementation. In this example, all of the features described above were used in the final model. The features were computed once per parameter configuration (like the different values for C as mentioned above, for example), thus 172 features were used as input in the model. When inspecting the feature importances that the Random Forest classifier outputs, it became clear that some features were much more discriminating. It was experimentally determined in this example that the most discriminative features were: (1) whether the photo contains faces, (2) how many friends a user has, and (3) the size of the cluster as formed by the temporal clustering.

Figure 4:
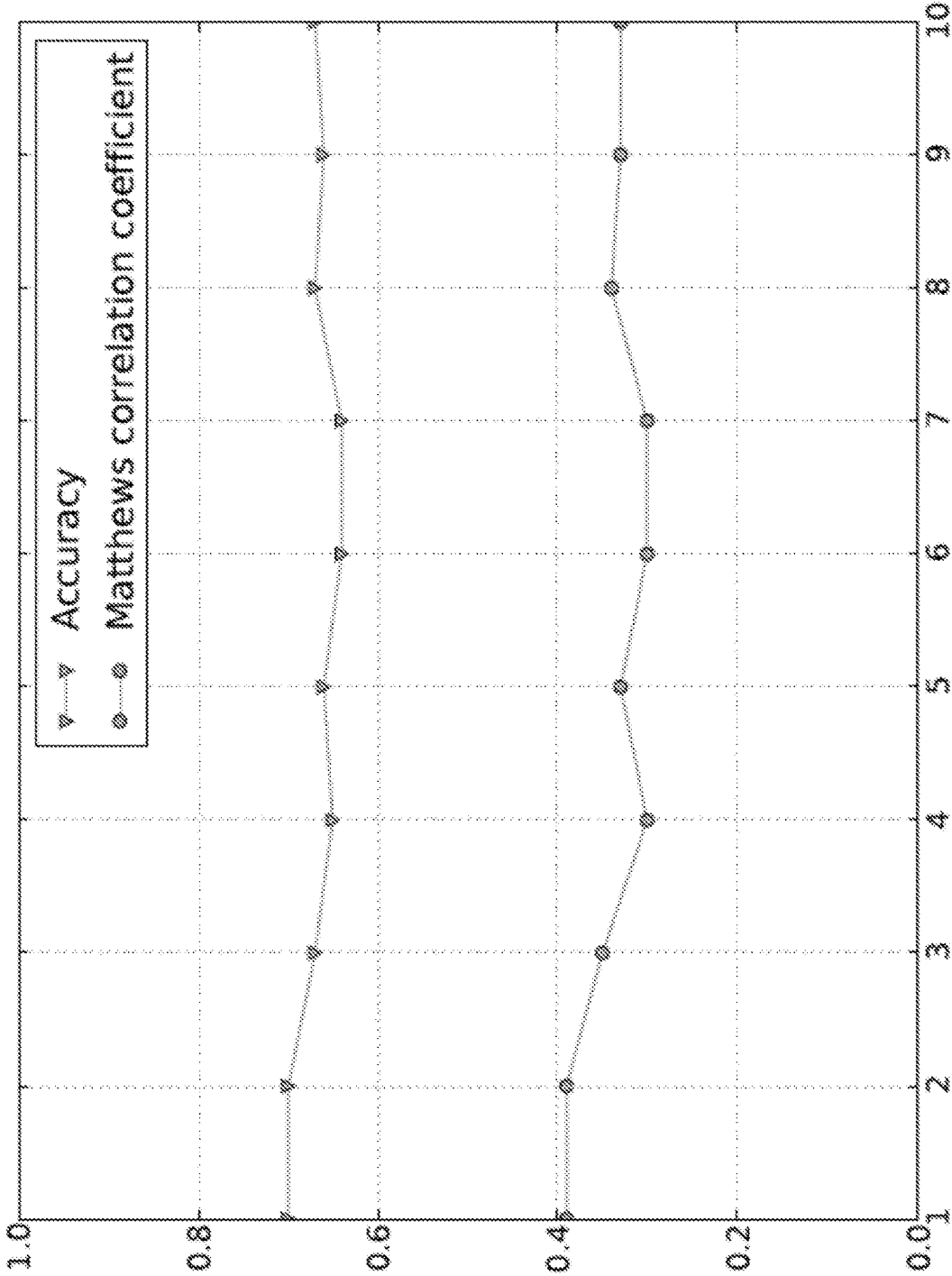
FIG. 4 depicts an illustration of a cross-validation evaluation 400, according to an example implementation.

FIG. 4 depicts an illustration of a cross-validation evaluation 400, according to an example implementation. Since the evaluation was done by cross-validation, any folds with characteristics that are different from the whole dataset may be reflected in the per-fold scores. In FIG. 4, it is apparent that the folds are not significantly different as the variation in scores per cross-validation fold is small.

For each cross-validation fold, a confusion matrix was generated. These were summed by matrix addition, and in Table 5, the sum of confusion matrices is shown. While the model had a positive result, i.e., it predicted more right than wrong, it also may have mispredicted some samples. With an average accuracy of 67% and average Matthews correlation coefficient of 0.34, the example model was not perfect. However, this accuracy figure might be misleading. Since the dataset used for training and testing was completely balanced, even a classifier that always predicted no share would get an accuracy of 50%. The accuracy this model achieved could therefore be seen as a 67/50=34% improvement over the base accuracy.

TABLE 5

Sum of confusion matrices from each cross-validation fold

|                    | Actual negative | Actual positive |
|--------------------|-----------------|-----------------|
| Predicted negative | 60,314          | 19,703          |
| Predicted positive | 33,978          | 46,039          |

The MCC and accuracy of this classifier may be compared to that of using a Naive Bayes classifier instead, as shown in Table 6. The performance of using a Naive Bayes classifier is clearly inferior to that performed by the Random Forest classifier. The Naive Bayes assumption of independence seems to be incorrect in this case, and that classifier does not capture all of the signal in the data.

TABLE 6

Average MCC and accuracy using Random Forest Naive Bayes

|               | Average MCC | Average accuracy |
|---------------|-------------|------------------|
| Random forest | 0.34        | 67%              |
| Naive Bayes   | 0.09        | 53%              |

The previous example was directed to determining a shareability of individual image. According to certain implementations, shareability may be determined for a group of images. The following example describes test results for a technique for determining a shareability of groups of photos, referred to herein as "events." Moreover, in addition to providing a "yes" or "no" determination, the example algorithm may provide a ranking of events by shareability.

For this example, the data available consisted of manually labeled photos from twenty-two users. An application for Apple's iOS platform was created for facilitating easy labeling of user photos. It was assumed that the participating users used their iOS device as their main device to take photographs. They were also expected to label a significant portion of their photos, starting with the most recent photos and going back in time. For each photo viewed, a user had four options: (1) I would share this photo with one person, (2) I would share this photo with more than one person, (3)

I would not share this photo, and (4) Do not include this photo in the study. The last option was available to users so that they could exclude photos they felt were too private or photos they did not want analysts to see.

For each photo a user labeled, several pieces of information were stored. A thumbnail of each photo was available, and depending on the orientation of the original photo it had a resolution of 90×120 pixels or 120×90 pixels. Metadata associated with the photos, called EXIF data, was stored for every labeled photo. This data included, among other items, information such as GPS coordinates, the date the photo was taken and the exposure time. GPS coordinates were provided for images where the device successfully acquired a location during the time of the photograph, however, this information was only available for the users who enabled this data to be shared.

More than 10,000 photos were labeled, according to the distributions shown in Table 7.

TABLE 7

Label distributions

| Label | Count |
| --- | --- |
| No share | 6,773 (42.0%) |
| Share with one | 2,317 (14.4%) |
| Share with many | 7,035 (43.6%) |
| Total | 16,125 |

Figure 6:
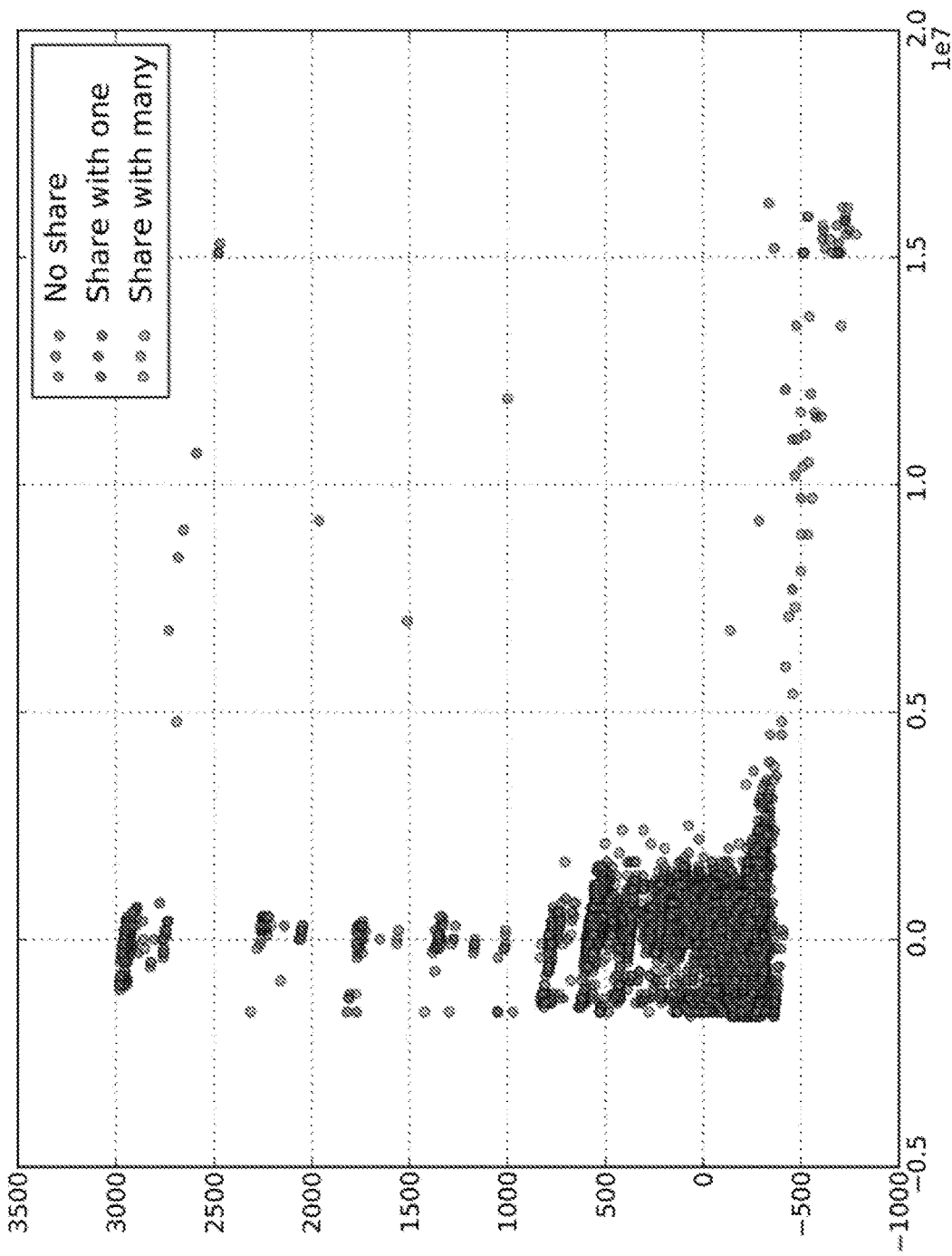
FIG. 6 depicts an illustration of PCA analysis 600 for photos using three labels, according to an example implementation.

With contributions in labels from only twenty-two users, a certain bias in the data may not be surprising. As seen in FIG. 6, some users labeled significantly more photos than other users.

Figure 5:
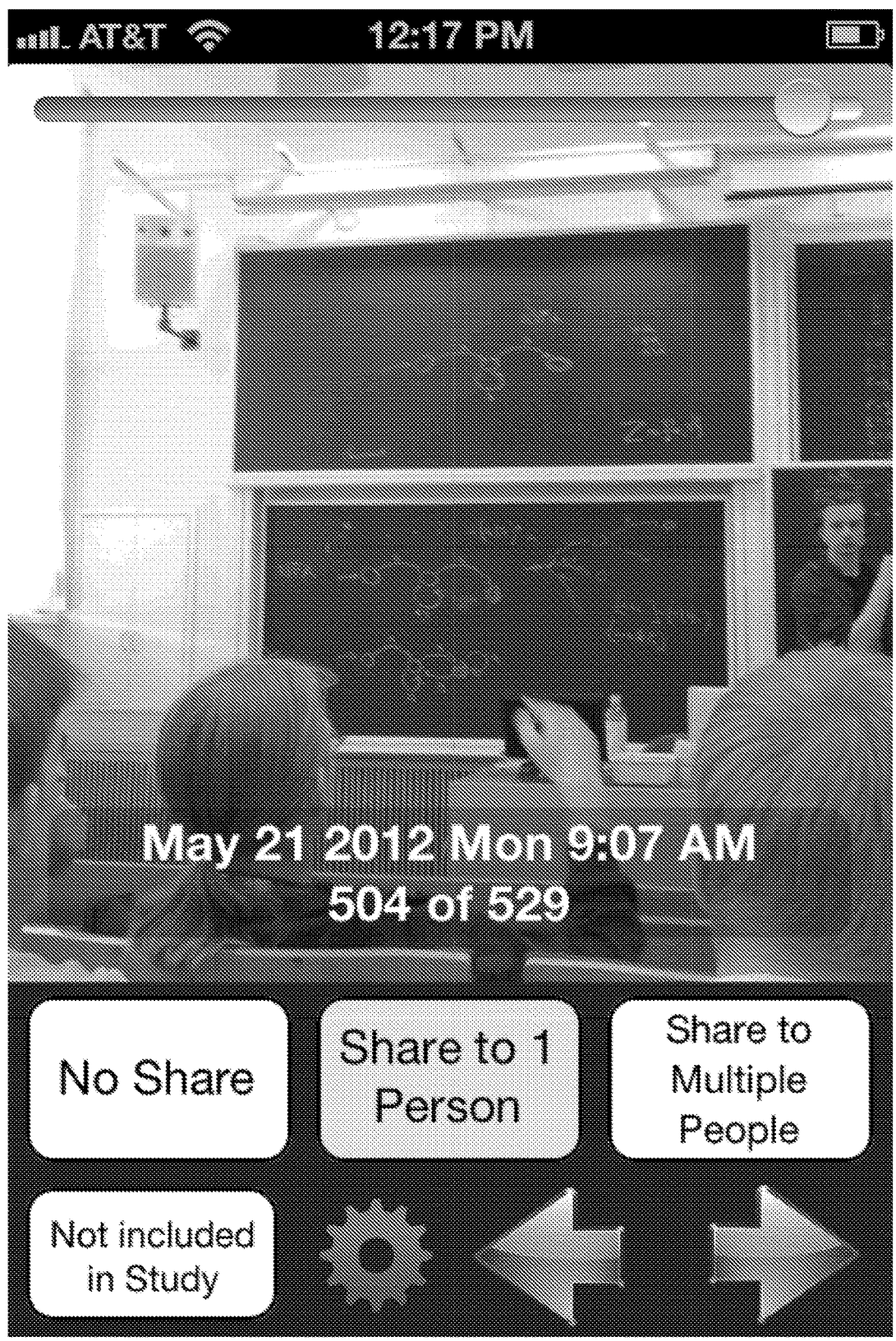
FIG. 5 depicts an illustration of user interface 500 for labeling photos, according to an example implementation.
Figure 7:
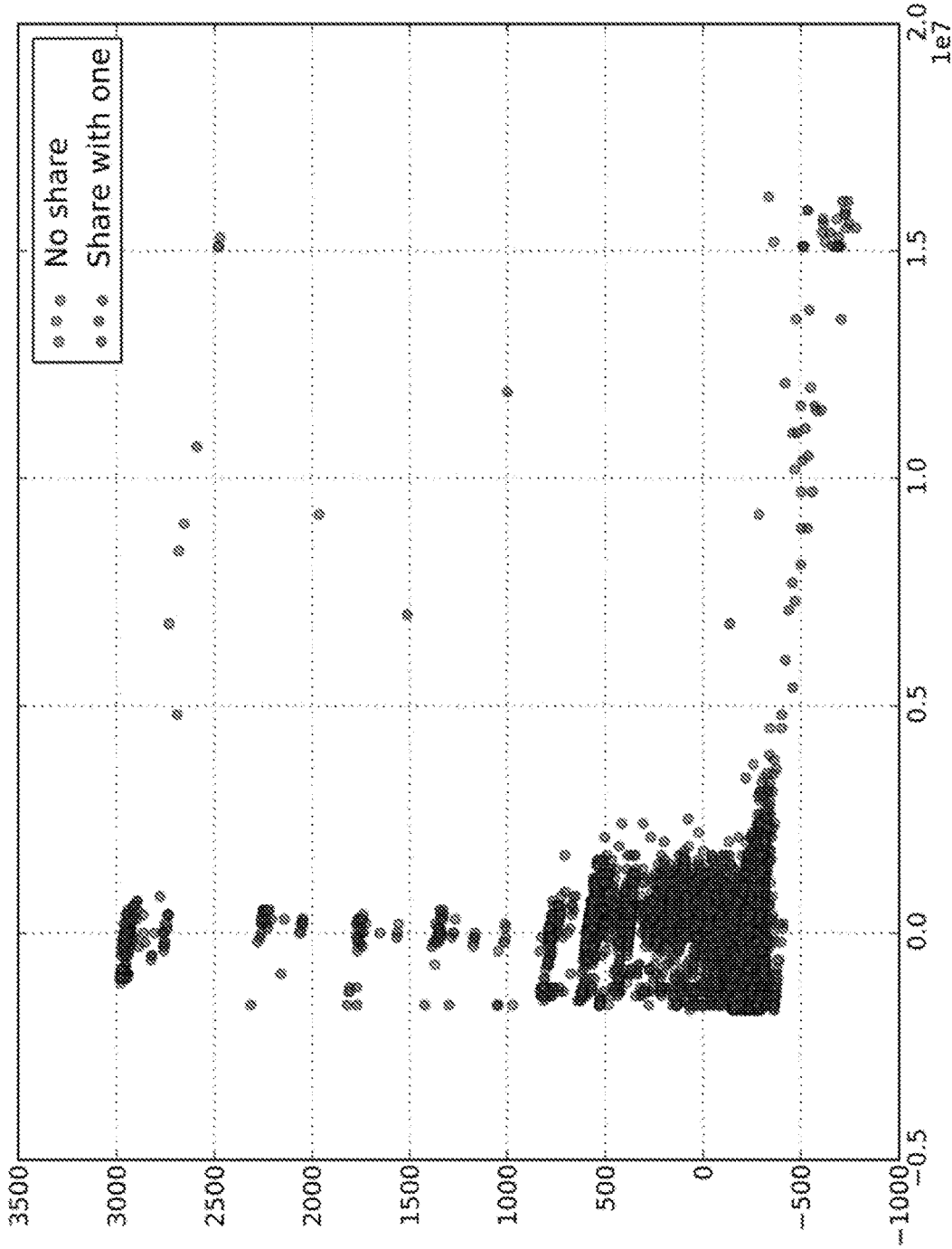
FIG. 7 depicts an illustration of PCA analysis 700 for photos using two labels, according to an example implementation.

FIG. 5 depicts an illustration of user interface 500 for labeling photos, according to an example implementation. As shown in FIG. 5, the UI was designed to allow people to label a large amount of photos in a small amount of time. Each photo was assigned one of the three labels. When plotting the PCA analysis for the photo samples and their features, it became apparent that it would be difficult to separate the labels Shared with one and Shared with many with any confidence. FIG. 6 depicts an illustration of PCA analysis 600 for photos using three labels, according to an example implementation. However when the two labels Shared with one and Shared with many instead were treated as a single label shareable, a PCA analysis as seen in FIG. 7 resulted.

For the example planned use case, it was deemed sufficiently unimportant to be able to distinguish between photos that should be shared with one person and photos that should be shared with multiple persons, at least when the confidence was very low. Instead it was decided to treat the two labels where a photo was shared as a single label shareable, making this into a binary classification problem.

Since labels were only available for individual photos, labels for the events had to be created. An event may comprise several photos, and a baseline may be set for how many shareable photos must be in an event for it to be recommended at all. This limit was set to 25%, so an event got the label shareable if at least 25% of the photos had been assigned the label shareable. This resulted in the dataset shown in Table 8.

TABLE 8

Sharing characteristics vary greatly between users

| User | Labeled photos | No share | Share with one | Share with many | Percent shared |
| --- | --- | --- | --- | --- | --- |
| 1 | 2282 | 516 | 186 | 1580 | 77.39 |
| 2 | 1587 | 289 | 232 | 1066 | 81.79 |
| 3 | 1502 | 887 | 269 | 346 | 40.95 |
| 4 | 1440 | 648 | 37 | 755 | 55.0 |
| 5 | 1207 | 574 | 478 | 155 | 52.44 |
| 6 | 1117 | 751 | 104 | 262 | 32.77 |
| 7 | 1044 | 135 | 203 | 706 | 87.07 |
| 8 | 988 | 703 | 164 | 121 | 28.85 |
| 9 | 932 | 247 | 152 | 533 | 73.5 |
| 10 | 819 | 304 | 152 | 363 | 62.88 |
| 11 | 626 | 287 | 112 | 227 | 54.15 |
| 12 | 526 | 397 | 35 | 94 | 24.52 |
| 13 | 503 | 349 | 78 | 76 | 30.62 |
| 14 | 459 | 276 | 20 | 163 | 39.87 |
| 15 | 338 | 115 | 28 | 195 | 65.98 |
| 16 | 209 | 107 | 19 | 83 | 48.8 |
| 17 | 152 | 109 | 21 | 22 | 28.29 |
| 18 | 116 | 42 | 11 | 63 | 63.79 |
| 19 | 89 | 1 | 7 | 81 | 98.88 |
| 20 | 88 | 36 | 6 | 46 | 59.09 |
| 21 | 60 | 0 | 3 | 57 | 100.0 |
| 22 | 41 | 0 | 0 | 41 | 100.0 |

In this example, the model was composed of two separate classifiers. The first classifier estimates sharing probabilities for a single photo. The second classifier estimates sharing probabilities for a whole event, taking aggregate information for an event into account. The two classifiers were then combined to make a final decision regarding the importance, or shareability of an event. For each of the classifiers, a set of features were engineered using the same process as described hereinabove.

TABLE 9

Class distributions in the user-labeled dataset

|  | Photos | Events |
| --- | --- | --- |
| Shareable | 5223 (57%) | 1501 (56%) |
| Not shareable | 3981 (43%) | 1168 (44%) |
| Total | 9204 | 2669 |

Two separate classifiers were used. The features used for the photo classifier are described in Table 10. The features used for the event classifier are described in Table 11.

TABLE 10

Features engineered for photo classifier

| Feature name | Explanation |
| --- | --- |
| Day of week | The day of week the photo was taken. |
| Density | The photo density where this photo was taken. |
| Exposure time | The exposure time used by the camera for this photo. |
| Face count | The number of faces found in this picture. |
| File size | The file size of the image. Certain types of images compress to a smaller file size, and as such the file size could be indicative of what the photograph contains. |
| Flash | What (if any) flash setting was used for this photograph. |
| F-Stop | The F-stop used for this photograph. |
| ISO | The ISO used for this photograph. ISO is indicative of how bright the scene was where the photo was taken. High ISO is correlated with less light. |

TABLE 10-continued

Features engineered for photo classifier

| Feature name | Explanation |
| --- | --- |
| Focal time | The local time of day when the photo was taken. |
| Orientation | The orientation of the phone as specified by the EXIF data. |
| Screenshot | If this photo is a screenshot, this is true. |

TABLE 11

Features engineered for event classifier

| Feature name | Explanation |
| --- | --- |
| Cluster rank | The rank of the cluster at which this event was located. |
| Duration | The duration of the event, e.g. the difference in time between first and last photograph. |
| Dwell time percentage | Percentage of total dwell time spent at the location this event was located. |
| End time | The local time when the last photo in this event was taken. |
| Percentage of photos with faces | Percentage of photos in this event that have one or more faces in them. |
| Is weekend | Whether this event occurred during a weekend. |
| Maximal base distance | Described later herein. |
| Minimal base distance | Described later herein. |
| Size | The number of photos in the event. |
| Start time | The local time when the first photo in this event was taken. |
| Total dwell time | Total dwell time spent at the location this event was located. |
| Total faces | The total number of faces detected in the photos in this event. |
| Trip type | The trip type for this event. |
| Days of week | The days this event spans. |
| Unique days at location | Number of unique days spent at the location this event was located. |
| Unique weeks at location | Number of unique weeks spent at the location this event was located. |

Photo Density: Since data was available for multiple users with their corresponding photos having location information, it was possible to build a density map of photographs taken. This map captured information about what locations are popular spots to take photographs in. In theory, the density at a popular location may be higher, and this may correlate with whether a photo is going to be shared or not. However, this correlation may not necessarily be linear. For example, low density and high density might be more favourable for sharing, while medium density might not signal as strongly.

A density map was computed using millions of points. The density map was then queried for one question: how many points exists near this latitude, longitude? This is the source of the density feature for the photo classifier. In this example, the threshold for "being near" was set to 100 meters.

Trip Detection: Since photo history over a longer period of time was available for each user, it was possible to list or determine what locations are most frequently visited by the user. For example, the user might take photos in their home or at their work with a frequency or regularity that is discernible from spontaneous outings such as lunches, parties or other short events. Being able to tell where a photo was taken in relation to a user's home or work may be correlated with the shareability of said photo. For example, if the user is on vacation, thousands of miles away, they might be more likely to share their photos compared with photos that were taken in their home.

Figure 8:
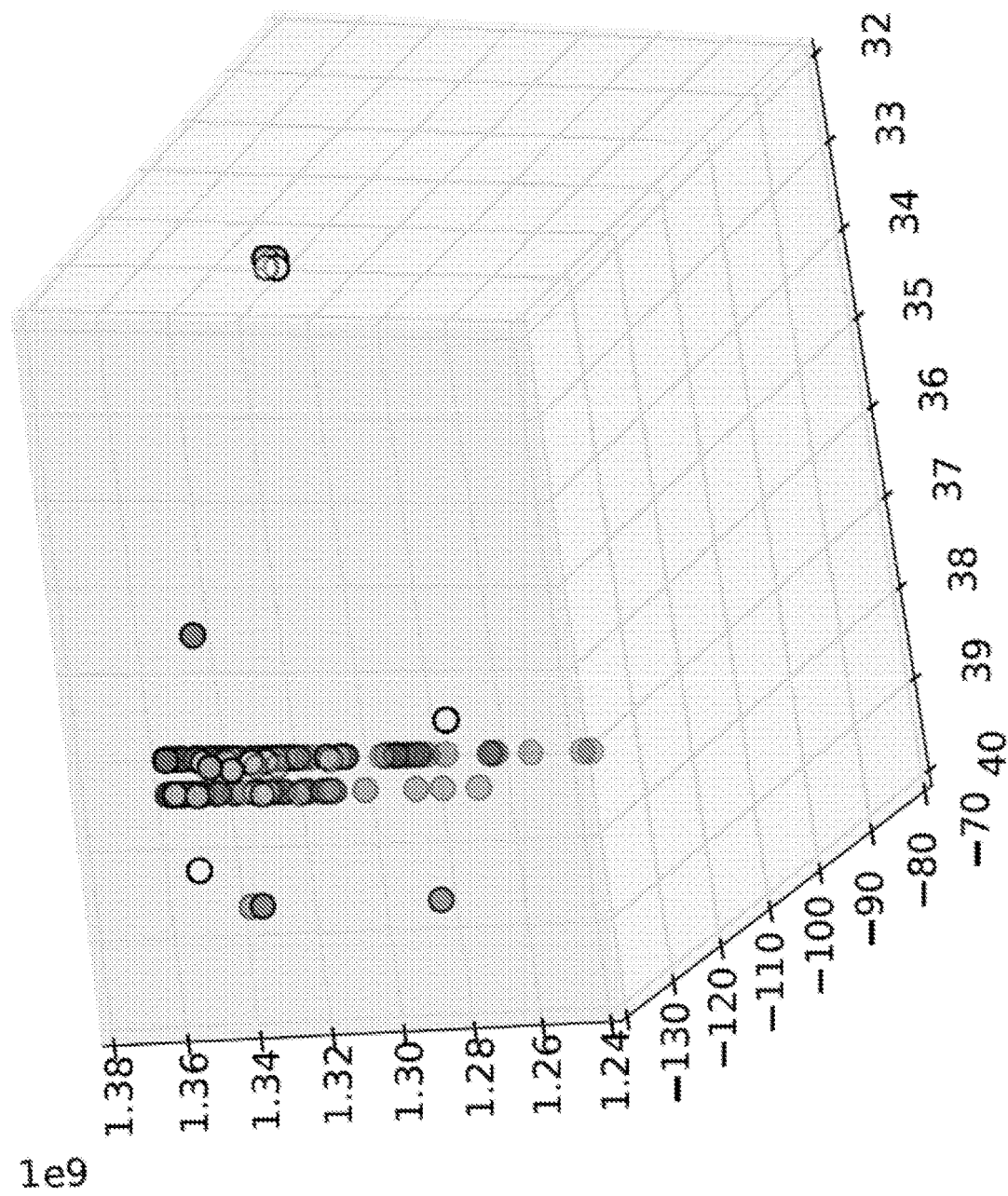
FIG. 8 depicts an illustration of a plot 800 of a user's photos in three dimensions: time, latitude and longitude, according to an example implementation.

FIG. 8 depicts an illustration of a plot 800 of a user's photos in three dimensions: time, latitude and longitude, according to an example implementation. These photos were taken over a three-year period. In FIG. 8, it is evident that there is a significant clustering of points in the spatial dimension, while the temporal dimension has more variation. Two major "trails" may be seen in FIG. 8. These are centered at the user's home and work location.

To compute features related to where the photograph was taken relative to a user's home and/or work, a home and work detection algorithm was created. The input may be a user's events, and output may be a set of attributes for each event. The attributes may indicate if the event was during a trip, or other information items. The example algorithm may be summarized as follows:

1. Create clusters using agglomerative hierarchical clustering.
2. For each cluster, compute:
   Total dwell time at this location. This may be done by creating events for all photos in the cluster, and summing their duration.
   Total dwell time fraction, as a measure of how much time had been spent at each cluster relative to the other clusters.
   Unique weeks and days that photos in cluster.
3. Compute cluster rank r as a linear combination of number of unique days, weeks and dwell time fraction. For example, $$r = 2.0 * \text{dwell\_time\_fraction} + 5.0 * \text{number\_of\_unique\_weeks} + 1.0 * \text{number\_of\_unique\_days}$$

4. The two highest ranking clusters are set as base_locations
5. Process events and associate them with the cluster information of the cluster they are located at. There is always a cluster for an event. The items assigned to each event are:
   total_dwell_time—Accumulated time spent at this cluster location.
   dwell_time_fraction—Amount of time spent at this cluster location relative to total dwell time.
   unique_weeks—Number of unique weeks at this cluster location.
   unique_days—Number of unique weeks at this cluster location.
   cluster rank—The rank of the cluster.
   min_base_distance—Minimal distance from this event to any of the base locations.
   max_base_distance—Maximal distance from this event to any of the base locations.

In this example, the algorithm used agglomerative hierarchical clustering to form groups of photographs that are spatially near each other.

For testing data, the dataset described earlier was used, however, only eight of the twenty-two users had confirmed home and work locations available. These users were used to test the final performance of the trip detection algorithm. For each user, their home and work location was known. The trip detection algorithm ranked the clusters, and the two highest ranking clusters set as baselocations. These baselocations were, in best case, the user's home and the user;s work, in any order. However, Table 12 shows how the algorithm actually ranked the home and work locations for the eight users. For one user, it found the user's home location as the highest ranked cluster, and the user's work location as the next highest ranked cluster. For six out of eight users it found their home location as one of the base locations. For five out of eight users it found their work location as one of the base locations.

TABLE 12

The trip detection algorithm detected home and work as base locations for five out of eight users

| User | Found home at index | Found work at index |
|---|---|---|
| 1 | 0 | 1 |
| 2 | 0 | 1 |
| 3 | 3 | 8 |
| 4 | 0 | 1 |
| 5 | 10 | 11 |
| 6 | 0 | 1 |
| 7 | 0 | 1 |
| 8 | 1 | 47 |

The rank of each event was given by a combination of the classification probability for the photos in the event and the classification probability of the event itself. To perform the actual ranking of the events the following was defined: An event e contains photos $p_1, p_2, \ldots, p_n$. The probability that a photo is shared, as given by the photo classifier, was defined by photo_prob(x). The recency of an event was a real number in the range [0, 1] where the most recent event has recency=1 and the oldest event has recency=0. The event share probability was defined by event_prob(c). As shown, the rank was computed as a linear combination of several attributes. This linear combination of factors was developed by using input from users.

event_rank(e) = 1.0 * event_prob(e) + 1.0 * recency +

0.5 * mean(photo_prob($p_1$), photo_prob($p_2$), ... , photo_prob($p_n$)) +

0.25 * median(photo_prob($p_1$), photo_prob($p_2$), ... , photo_prob($p_n$))

Figure 9:
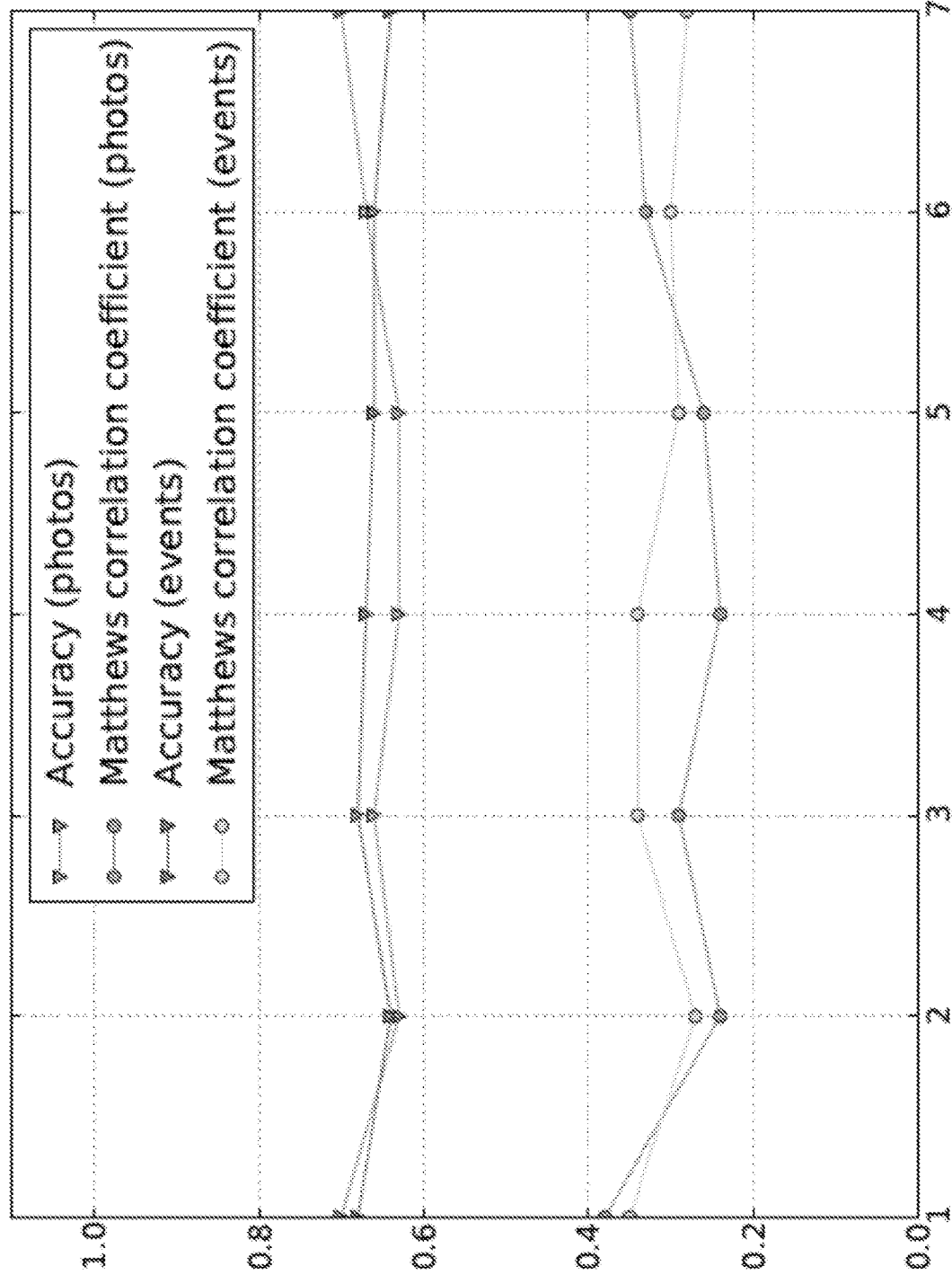
FIG. 9 depicts an illustration of a 7-fold cross-validation 900 for two classifiers, according to an example implementation.

Evaluating the whole model on a large scale may be difficult as it requires users to rank their events. The requisite data was not available and not possible to produce. However, the two classifier's performance may still be evaluated since there was a large amount of labeled data. A seven-fold cross-validation was performed for both classifiers, and their scores on the test fold were recorded for each fold. In FIG. 9, the accuracy and Matthews correlation coefficient (MCC) scores achieved per fold are shown. While there is variation in the data, the scores appear fairly consistent. A positive MCC score of 0.3 and 0.31 (see Table 13) indicates the classifiers are correlated with the labels. For comparison, the scores for a Naive Bayes classifier are shown in Table 14. As evident from the scores, the Naive Bayes classifier does a noticeably worse job at classifying the samples. This is not unexpected given the independence assumption in Naive Bayes classifiers.

TABLE 13

Average scores for photo and event classifier

| | Photo classifier | Event classifier |
|---|---|---|
| Average MCC | 0.30 | 0.31 |
| Average accuracy | 66% | 66% |

TABLE 14

Average scores for Naive Bayes classifier

| | Photo classifier | Event classifier |
|---|---|---|
| Average MCC | 0.17 | 0.19 |
| Average accuracy | 61% | 57% |

One user for whom additional data was available, was asked to comment on the output of the example model. The ten best events according to the model were selected and presented to this user. Out of these ten events, seven were considered to be shareable events. The user remarked that the events selected were approximately correctly ranked in recency and importance, save for the three events that were non shareable.

As evidenced by the above examples, it is non-trivial to predict whether a photograph is going to be shared. Even when utilizing many features and extrapolating from the available data, the example models still turned in a moderate performance. This may be unsurprising as predicting human behavior can be a complicated and nuanced task.

FIG. 10 is a flow diagram of a method 1000 for separating shareable images from non-shareable images, according to an example implementation. As shown in FIG. 10, the method 1000 starts in block 1002, and, according to an example implementation, includes receiving, by a computing device, a plurality of images associated with a first user of a social media network, each respective image having a timestamp. In block 1004, the method 1000 includes defining, by the computing device, a grouping of the plurality of images into a plurality of image clusters, wherein a first image cluster of the plurality of image clusters comprises (1) an initial image from the plurality of images and (2) one or more other images from the plurality of images having a timestamp within a predetermined amount of time of at least one of a timestamp associated with the initial image and a timestamp associated with one of the other images in the first image cluster. In block 1006, the method 1000 includes determining, by the computing device, based at least partially on a number of images in the first image cluster, a likelihood that the first user will share a first image in the first cluster. In block 1008, the method 1000 includes responsive to determining the likelihood exceeds a predetermined threshold, outputting, by the computing device, for display, a prompt to the first user to share the first image on the social media network.

FIG. 11 is a flow diagram of another method 1100 for separating shareable images from non-shareable images, according to an example implementation. As shown in FIG. 11, the method 1100 starts in block 1102, and, according to an example implementation, includes receiving, by a computing device, a plurality of images associated with a first user of a social media network, each respective image having a timestamp. In block 1104, the method 1100 includes defining, by the computing device, a grouping of the plurality of images into a plurality of image clusters, wherein a first image cluster of the plurality of image clusters comprises (1) an initial image from the plurality of images and (2) one or more other images from the plurality of images having a timestamp within a predetermined amount of time of at least one of a timestamp associated with the initial image and a timestamp associated with one of the other images in the first image cluster.

In block 1106, the method 1100 includes determining, by the computing device, for each respective image in a first image cluster of the plurality of image clusters, a likelihood that the first user will share the respective image. In block 1108, the method 1100 includes determining, by the computing device, based on the likelihoods of the first user sharing the respective images from the first image cluster, a likelihood of the first user sharing the first image cluster. In block 1110, the method 1100 includes determining, by the computing device, based on the likelihoods of the first user sharing the respective images from the first image cluster, a likelihood of the first user sharing the first image cluster. In block 1112, the method 1100 includes responsive to determining the likelihood of the first user sharing the first image cluster exceeds a predetermined threshold, outputting, by the computing device, for display, a prompt to the first user to share the first image cluster on the social media network.

It will be understood that the various steps shown in FIGS. 10-11 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method, comprising:
    receiving a plurality of images associated with a user, each respective image having associated metadata;
    determining, based on the plurality of images, one or more features of the plurality of images as input for a machine learning classifier;
    determining, using the machine learning classifier and based on the one or more features, that a likelihood of the user sharing at least one image of the plurality of images exceeds a predetermined threshold, wherein the likelihood of the user sharing the at least one image is determined based on, at least in part, a number of photos taken by the user on a day that the at least one image was taken; and
    in response to determination that the likelihood exceeds the predetermined threshold, outputting for display, a prompt to the user to share the at least one image.

2. The computer-implemented method of claim 1, wherein the associated metadata includes a respective timestamp for each image of the plurality of images, and wherein the one or more features include at least one of: the day of a week that each image of the plurality of images was taken or a local time of day at which each image of the plurality of images was taken.

3. The computer-implemented method of claim 1, wherein the one or more features include an exposure time used by a camera for capture of each of the plurality of images, a flash setting used by the camera for capture of each of the plurality of images, an ISO setting used by the camera for capture of each of the plurality of images, a file size of each of the plurality of images, or an orientation of the camera for capture of each of the plurality of images.

4. The computer-implemented method of claim 1, wherein the one or more features includes a photo density at a location associated with each image of the plurality of images, wherein the photo density is based on a density map that indicates locations that are popular spots in which to take photographs.

5. The computer-implemented method of claim 1, wherein
   the plurality of images are associated with an event,
   the machine learning classifier includes a photo classifier that estimates a sharing probability for each image of the plurality of images and an event classifier that estimates a sharing probability for the event, and
   the likelihood of the user sharing the at least one image is based on combining the sharing probabilities output by the photo classifier and the event classifier.

6. The computer-implemented method of claim 1, wherein the plurality of images include an initial image and one or more other images that are each associated with a timestamp that is at least one of: within a predetermined amount of time from a timestamp associated with the initial image or a timestamp associated with another image of the one or more other images.

7. The computer-implemented method of claim 1, wherein the machine learning classifier is trained using supervised machine learning using training data that includes a plurality of training images and a respective label for each training image, wherein each respective label has a value that is one of: shared or non-shared.

8. A non-transitory computer readable storage medium storing at least one program configured for execution by at least one processor, the at least one program comprising instructions that, when executed by the at least one processor, cause the at least one processor to perform operations comprising:
   receiving a plurality of images associated with a user, each respective image having associated metadata;
   determining, based on the plurality of images, one or more features of the plurality of images as input for a machine learning classifier;
   determining, using the machine learning classifier and based on the one or more features, that a likelihood of the user sharing at least one image of the plurality of images exceeds a predetermined threshold, wherein the one or more features includes a photo density at a location associated with each image of the plurality of images, wherein the photo density is based on a density map that indicates locations that are popular spots in which to take photographs; and
   in response to determination that the likelihood exceeds the predetermined threshold, outputting for display, a prompt to the user to share the at least one image.

9. The non-transitory computer readable storage medium of claim 8, wherein the associated metadata includes a respective timestamp for each image of the plurality of images, and wherein the one or more features include at least one of: a day of week that each image of the plurality of images was taken or a local time of day at which each image of the plurality of images was taken.

10. The non-transitory computer readable storage medium of claim 8, wherein the one or more features include an exposure time used by a camera for capture of each of the plurality of images, a flash setting used by the camera for capture of each of the plurality of images, an ISO setting used by the camera for capture of each of the plurality of images, a file size of each of the plurality of images, or an orientation of the camera for capture of each of the plurality of images.

11. The non-transitory computer readable storage medium of claim 8, further comprising building the density map based on multiple photos associated with location information.

12. The non-transitory computer readable storage medium of claim 8, wherein
   the plurality of images are associated with an event,
   the machine learning classifier includes a photo classifier that estimates a sharing probability for each image of the plurality of images and an event classifier that estimates a sharing probability for the event, and
   the likelihood of the user sharing the at least one image is based on combining the sharing probabilities output by the photo classifier and the event classifier.

13. The non-transitory computer readable storage medium of claim 8, wherein the plurality of images include an initial image and one or more other images that are each associated with a timestamp that is at least one of: within a predetermined amount of time from a timestamp associated with the initial image or a timestamp associated with another image of the one or more other images.

14. The non-transitory computer readable storage medium of claim 8, wherein the likelihood of the user sharing the at least one image is determined based on, at least in part, a number of photos taken by the user on a day that the at least one image was taken.

15. A computing device comprising:
   a processor; and
   a memory coupled to the processor with instructions stored thereon that, when executed by the processor cause the processor to perform operations comprising:
      receiving a plurality of images associated with a user, each respective image having associated metadata, the plurality of images associated with an event;
      determining, based on the plurality of images, one or more features of the plurality of images as input for a machine learning classifier, wherein the machine learning classifier includes a photo classifier that estimates a sharing probability for each image of the plurality of images and an event classifier that estimates a sharing probability for the event;
      determining, using the machine learning classifier and based on the one or more features, that a likelihood of the user sharing at least one image of the plurality of images exceeds a predetermined threshold, wherein the likelihood of the user sharing the at least one image is based on combining the sharing probabilities output by the photo classifier and the event classifier; and
      in response to determination that the likelihood exceeds the predetermined threshold, outputting for display, a prompt to the user to share the at least one image.

16. The computing device of claim 15, wherein the associated metadata includes a respective timestamp for each image of the plurality of images, and wherein the one or more features include at least one of: a day of week that each image of the plurality of images was taken or a local time of day at which each image of the plurality of images was taken.

17. The computing device of claim 15, wherein the one or more features includes a photo density at a location associated with each image of the plurality of images, wherein the photo density is based on a density map that indicates locations that are popular spots in which to take photographs.

18. The computing device of claim 15, wherein the likelihood of the user sharing the at least one image is determined based on, at least in part, a number of photos taken by the user on a day that the at least one image was taken.

19. The computing device of claim 15, wherein the plurality of images include an initial image and one or more other images that are each associated with a timestamp that is at least one of: within a predetermined amount of time from a timestamp associated with the initial image or a timestamp associated with another image of the one or more other images.

20. The computing device of claim 15, wherein the machine learning classifier is trained using supervised machine learning using training data that includes a plurality of training images and a respective label for each training image, wherein each respective label has a value that is one of: shared or non-shared.

\* \* \* \* \*